July 9, 1968  L. D. MULLER ETAL  3,391,784
APPARATUS FOR THE SEPARATION OF GRANULAR MATERIALS
Filed Feb. 1, 1965  4 Sheets-Sheet 1

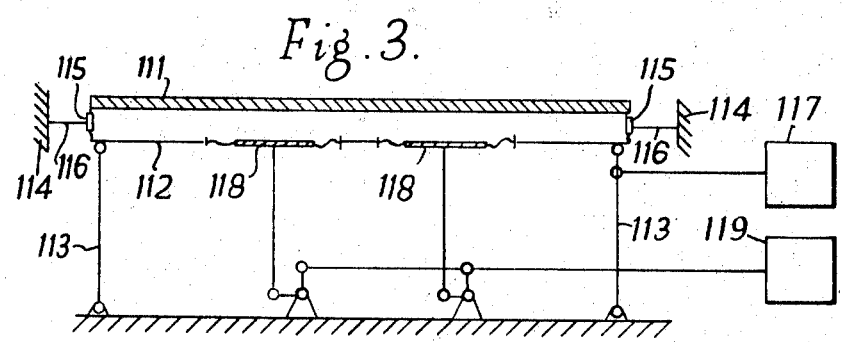
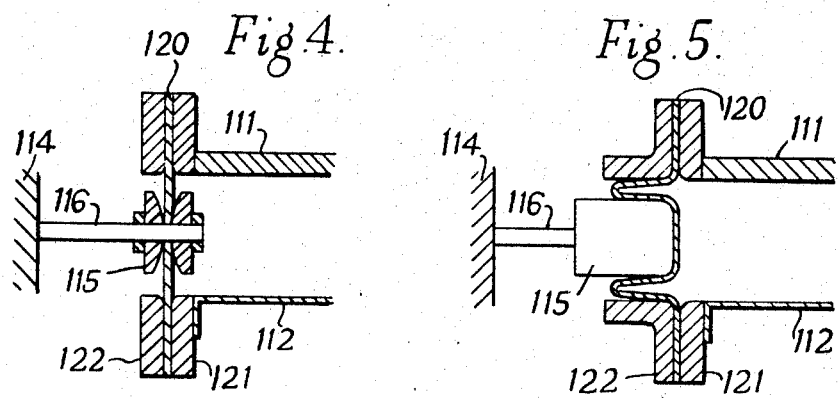
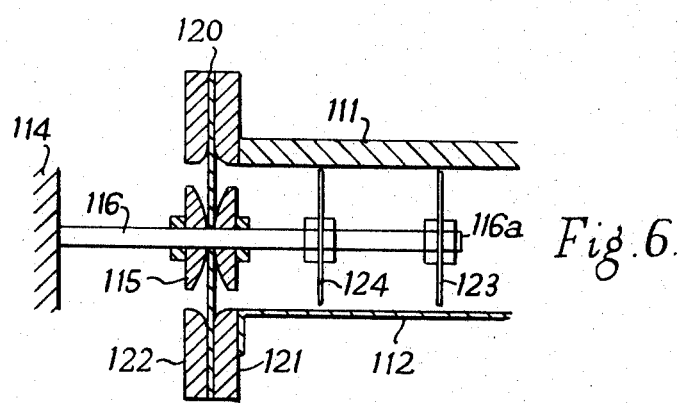

United States Patent Office
3,391,784
Patented July 9, 1968

3,391,784
APPARATUS FOR THE SEPARATION OF GRANULAR MATERIALS
Leslie Dyne Muller, Charles Philip Sayles, and Richard Henry Mozley, Stevenage, England, assignors to National Research Development Corporation, London, England, a British corporation
Filed Feb. 1, 1965, Ser. No. 429,465
Claims priority, application Great Britain, May 29, 1964, 22,371/64; Jan. 8, 1965, 985/65
18 Claims. (Cl. 209—427)

ABSTRACT OF THE DISCLOSURE

Apparatus for separating granular materials comprising an elongated tank having a deck of material porous to a fluid, such as water, spaced above the tank bottom, means for reciprocating said deck in the direction of its length and in its own, substantially horizontal, plane means for producing an upward and downward flow of said fluid through said deck from and to a body of such fluid located between said deck and the tank bottom in timed relationship to the reciprocation cycle of said deck, and means for preventing the said body of fluid between said deck and the tank bottom from sharing in any appreciable extent in the reciprocatory motion imparted to said deck.

---

The present invention relates to apparatus for the separation of granular materials by stratification thereof, for instance the separation of crushed ore into its constituent minerals.

For this purpose it has been known for many years to employ a table or pan carrying the material with means for giving it a rapid oscillatory or reciprocatory movement. This movement however is asymmetric, that is to say it is different in forward and backward directions, and as a result the particles travel along the pan in one of the directions of reciprocation and the heavier particles tend to be moved further than the lighter particles so that gradual separation is achieved. The process is generally facilitated by providing a stream of liquid, usually water, which reduces friction between the particles and increases the effect of separation.

It has already been proposed in an arrangement of this general type to increase the separating effect by providing the container with a porous floor or deck to which pressure pulses of fluid are applied. If the fluid is a gas, air will generally be used, while if the fluid is a liquid this will usually be water. This present invention is concerned with apparatus of this general type and the chief object is to make the action of separation more rapid and complete.

Investigations have shown that the phase relationship between the shaking movement and the pressure pulses needs to be accurately defined if the best results are to be achieved. Though the movement of the table as suggested above is asymmetric in the sense that it is different on opposite sides of its mean position, it is conveniently such that the backward movement may be regarded as the mirror image of the forward movement. Thus, at the start of the forward movement acceleration is comparatively low and gradually increases throughout most of the stroke after which there is a very rapid deceleration. This is continued into the backward stroke so that a high reverse velocity is quickly obtained and this gradually falls off throughout the remainder of the backward stroke. Thus, the transition from backward to forward stroke is effected comparatively slowly, while the transition from forward stroke to backward stroke is comparatively sudden. Forward stroke in this context is defined as movement in the direction in which the particles move. Within these general limits, however, the durations of the backward and forward strokes need not in fact be equal.

It will be appreciated that pressure pulses are both positive and negative, that is to say, they produce both an upward pressure effect and a downward suction effect which will be represented by the water or other fluid passing upwards and downwards through the porous floor. The simplest arrangement is to make use of pulses which follow a sinusoidal pattern and this is likely to be satisfactory in practice.

According to the invention, apparatus for the separation of granular materials comprises a table including an elongated tank, a porous floor or deck spaced a short distance from the bottom of the tank, means for reciprocating the deck in the direction of its length and in its own plane in a recurrent cycle, and means for producing an upward and downward flow of fluid through the porous deck in a cycle of the same length as the reciprocating cycle of the deck, the point at which the fluid flow changes from downward to upward flow being between 30° and 5° of the said reciprocating cycle before the instant at which the deck comes to rest between a forward stroke and the succeeding backward stroke, and the point at which the fluid flow changes from upward to downward flow being between 30° of the said cycle before and 70° of the said cycle after the instant at which the deck comes to rest between a backward stroke and the succeeding forward stroke.

The asymmetry of the deck reciprocating movement should preferably be such that the forward and backward stroke times do not differ by more than 15% of the longer of the two times and it is desirable that the transition between the forward stroke and the backward stroke should be a sharp transition while the transition between the backward stroke and the forward stroke should be a smooth transition.

There are two effects obtainable from the pulsed flow of fluid through the porous floor of the table; the downward flow (a negative pulse) helps to pin the particles to the deck for the time during which they are required to travel with the deck, that is to say during the major part of the forward stroke. This pinning-down effect must stop before the end of the forward stroke because the latter part of the stroke is occupied with rapid deceleration of the deck and it is important for efficient separation that the particles should run on by reason of their momentum and not be brought to rest with the deck as they would be if they were pinned thereto. It is difficult to specify with exactitude the latest point in the forward stroke by which downward fluid flow should cease as the shape of the displacement/time curve of the deck motion varies as between one type of mechanism and another and even with one type of mechanism as between the worn and unworn condition. So long as there is still a substantial proportion of the final deceleration part of the deck motion at the end of the forward stroke remaining to be accomplished when downward pulse fluid flow ceases, a certain overlap into that part of the forward stroke may be permitted.

The upward flow of fluid (a positive pulse) helps to release particles from the deck at the end of the forward stroke but its most important contribution to efficiency is its effect in prolonging the elevation of the particles when the forward momentum is becoming exhausted and enabling them to avoid contact and backward transport with the deck during later parts of the backward stroke. This upward flow may be allowed to continue into the early part of the forward stroke as the deck is then moving slowly.

It is possible to superimpose a net upward flow of fluid upon the alternating pulsed flow by increasing the amplitude of the upward flow in relation to the downward flow. This may have certain advantages, for instance the prevention of clogging, as against the arrangement in which there is no net flow through the porous deck. This advantageous result can readily be obtained by superimposing a small net upward flow upon a substantially sinusoidal up-and-down flow/time characteristic so that more of the cycle is occupied with upward flow than with downward flow.

If the upward and downward flow of fluid is arranged as suggested to be on a generally sinusoidal basis without any net flow in either direction, this can conveniently be effected by the use of a simple diaphragm pump. The mechanical arrangements for effecting the reciprocation of the table may be of known type and a common drive will preferably be employed for the deck and pump with provision for altering the phase relationship between the two cyclic movements.

The mechanical construction generally described above is found to work quite satisfactorily for comparatively small scale equipment, but as the size is increased to that necessary for full commercial operation and when a liquid such as water is used as the fluid, some difficulty is experienced owing to the generation of standing waves in the body of the liquid necessarily enclosed between the porous floor or deck and the bottom of the tank carrying the pulse-supplying mechanism. This arises from the fact that the standing waves interfere with the pressure pulses which therefore cannot be properly synchronised and phased with the reciprocating motion of the deck over its whole surface, with the result that movement of the material is not uniform but produces uneven distribution and hence very unsatisfactory separation. It is accordingly a further object of the invention to avoid the generation of such standing waves and permit full benefit to be obtained from the use of controlled interrelation between the phase of the pressure pulses and the reciprocating movement of the deck. This is achieved by arranging that the enclosed body of liquid is prevented from sharing to any marked extent in the reciprocating movement of the deck.

The invention will be better appreciated from the following description of a number of embodiments which should be taken in conjunction with the accompanying drawings comprising FIGURES 1–12.

FIGURE 3 shows diagrammatically a preferred embodiment for the avoidance of standing waves;

FIGURES 4, 5 and 6 show alternative detailed constructions of FIGURE 3;

Figure 1:
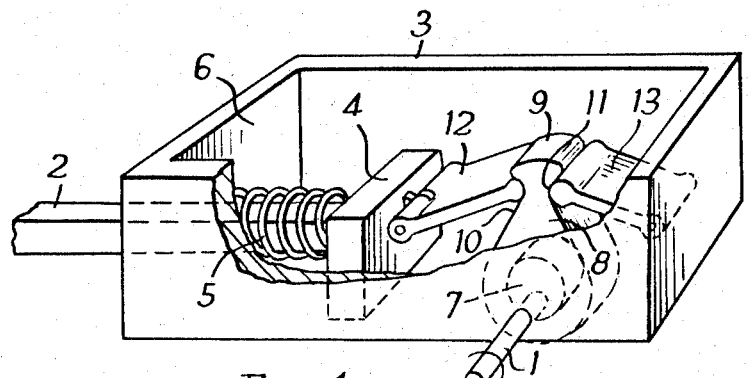
FIGURE 1 shows diagrammatically the arrangement assumed to be used for producing the desired motion of the deck and FIGURE 2 shows a suitable arrangement for operating the pulsing diaphragm and adjusting the phase of the pulses relative to the reciprocating cycle.

FIGURE 1 shows details of a so-called drive box or head motion, that is to say a mechanism to which power is applied to rotate a suitably journalled shaft and from which a bar extends for connection to the table to give it the necessary reciprocating movement. In FIGURE 1 the shaft is shown at 1 and the bar at 2 and it will be understood that the bar is given a reciprocating movement in the direction of its length and is connected to the table which is suitably supported, for instance, on springs, rollers or swinging links, so that it can perform the required movement. The driving arrangements include a substantially rectangular fixed frame 3 in which is located a cross-piece 4 connected to the bar 2 and arranged to be subjected in any position to the action of a compression spring 5, the other end of which seats against the end 6 of the frame 3. The shaft 1 carries an eccentric 7 which is located in a circular hole in the driving member 8. This is of the shape shown with an enlarged head 9 formed by grooves 10 and 11 on opposite sides thereof. These grooves are engaged by the free ends of links 12 and 13 which are pivoted respectively to the cross-piece 4 and to the end of the frame 3 remote from the bar 2.

As will be appreciated, rotation of the eccentric causes the driving member 8 to perform substantially vertical reciprocation with the result that the links 12 and 13 are turned through an angle so as to be alternately substantially in line and in an oblique position as shown in the drawing. It will be clear that with this construction the movement of the table is comparatively slow when the links are substantially in line but when they are in their limiting oblique position, a small angular movement of the eccentric 7 produces a comparatively large movement of translation of the cross-piece 4.

Figure 2:
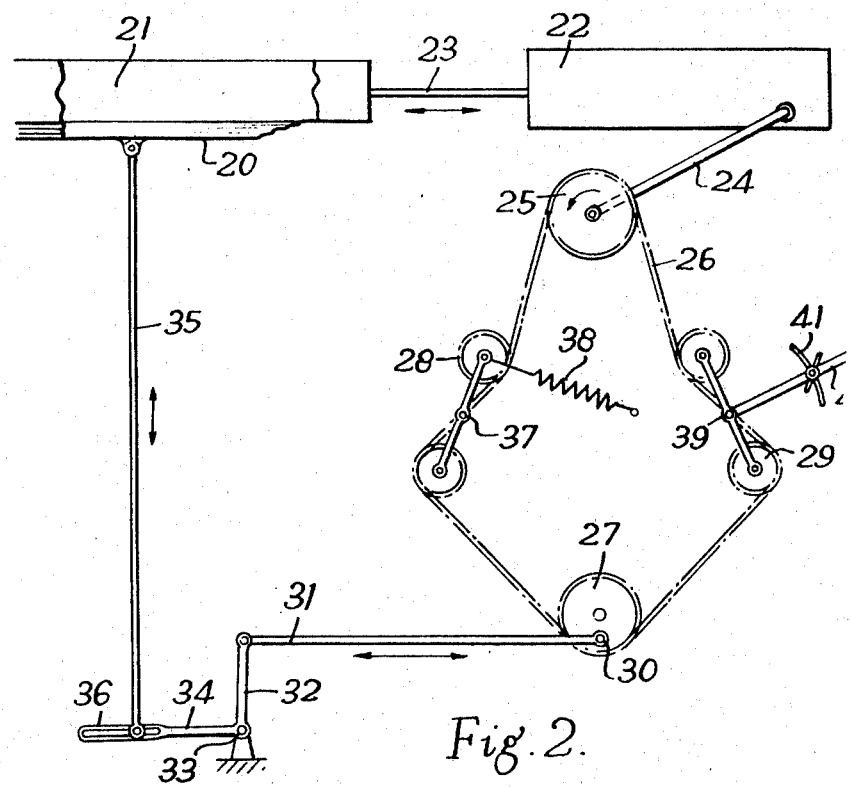

FIGURE 2 shows a suitable drive for the pulsing diaphragm, which is indicated at 20 and is secured to the bottom of the tank below the porous floor 21. The drive box as shown in FIGURE 1 is indicated at 22 and the bar 2 of FIGURE 1 is represented by 23, while the drive shaft of FIGURE 1 may also be the shaft 24 of FIGURE 2. This shaft carries a sprocket 25 round which passes a chain 26 which drives the sprocket 27 by way of pairs of rigidly-connected adjustable jockey pulleys 28 and 29. It is arranged that the chain passes between each pair of jockey pulleys and they are pivoted at a point which is conveniently midway between their centers. The sprocket 27 carries an eccentric pin 30 whereby oscillatory movement is given to the rod 31 which produces corresponding movement of the bell crank lever 32 which is pivoted at 33. The other arm 34 of this lever drives the connecting rod 35 which is attached to the diaphragm 20. It will be appreciated that by making this rod comparatively long, the reciprocatory movement of the table has comparatively little effect on the operation of the diaphragm 20. The point of attachment of the connecting rod 35 is adjustable along the slot 36 in the arm 34 of the bell crank lever so as to give the possibility of adjusting the amplitude of the diaphragm movement.

It will be noted that one pair of jockey pulleys 28 which is pivoted at 37 is subject to the action of the spring 38 so as to take up any slack in the chain, while the other pair 29 which is pivoted at 39 can be moved by means of the attached lever 40 carrying a pin which can be secured in the appropriate position in the slot 41. A pivoting movement of this pair of jockey pulleys by operation of the lever 40 has the effect of altering the length of the run of the chain 26 between one side of the sprockets 25 and 27 as compared with the length of the chain run on the other side of the sprockets and thus altering the phase relationship between the drive for the table and the drive for the pulsing diaphragm.

As an alternative to the arrangement shown in FIGURE 2, the connection between the shaft 24 and the wheel carrying the eccentric pin 30 may include differential gearing instead of the chain and sprockets in order to permit the possibility of phase adjustment. It will be understood that one of the drive elements of this gear would be a manually adjustable knob intended to effect phase adjustment.

Though it is not particularly brought out in the showing of FIGURE 2, it will be appreciated that with the constructions which this figure illustrates, a body of fluid, usually water, is enclosed between the porous deck and the bottom of the tank which includes the pressure-pulse-producing means. This body of fluid is reciprocated substantially as a whole with the tank and deck by the driving motion. The modified arrangements illustrated in FIGURES 3–12 are intended to ensure that this mass of fluid is caused to remain substantially stationary while reciprocation of the deck takes place as before and phased pressure pulses are applied thereto.

Considering first the arrangement of FIGURE 3, 111 is the porous deck and 112 the tank beneath it and sealed fluid-tightly to it. Both are attached by means of deflectable mountings 113 to a fixed base 114. In the vertical ends of the tank, which is preferably of long narrow rectangular shape, are pistons 115 sealed to the tank by flexible diaphragms. The pistons 115 are connected by rigid members 116 to the fixed base 114. When the table comprising deck 111 and tank 112 is reciprocated, the water in the tank remains substantially stationary between pistons 115 and is only disturbed by friction with the under surface of the porous deck and the walls of the tank. Pulses are applied substantially as in the construction illustrated in FIGURE 2 by means of pistons or diaphragms 118 worked by linkage from a head 119 connected with the main drive 117. The motion of diaphragms 118 accordingly has a predetermined phase relationship with the motion of the table.

FIGURE 4 shows in more detail how the piston 115 operates in the end of tank 112. The piston is made in two parts, one inside and one outside the diaphragm 20, and makes a liquid-tight seal with it. The periphery of the diaphragm is gripped between flanges 121 and 122 which seal it liquid-tightly to the tank. Motion of the piston relative to the tank is permitted by the flexing of the diaphragm and the stroke of the table may be of the order of ¾". Desirably, the halves of the piston are made arcuate in section on the sides facing the diaphragm so as to reduce the stresses in the latter. For a similar reason, the edges of the flanges 121, 122 may be relieved where the diaphragm is gripped.

FIGURE 5 shows alternative construction in which the diaphragm 120 is doubled back on itself between the piston 115 and the extended flange 122. In this way, lower stresses are imposed upon the diaphragm and it is likely to last longer. Diaphragms of such a form are available under the Trade Mark "BELLOFRAM."

The pistons 115 may be rendered even more effective by the construction shown in FIGURE 6. The piston 115 carries on extension rods 116a a number of baffles 123, 124 which nearly fill the cross-section of the tank 112 between the deck and the bottom. The baffles are here shown applied to the piston and diaphragm construction of FIGURE 4 but the same arrangement could readily be applied to the construction of FIGURE 5.

Figure 7:
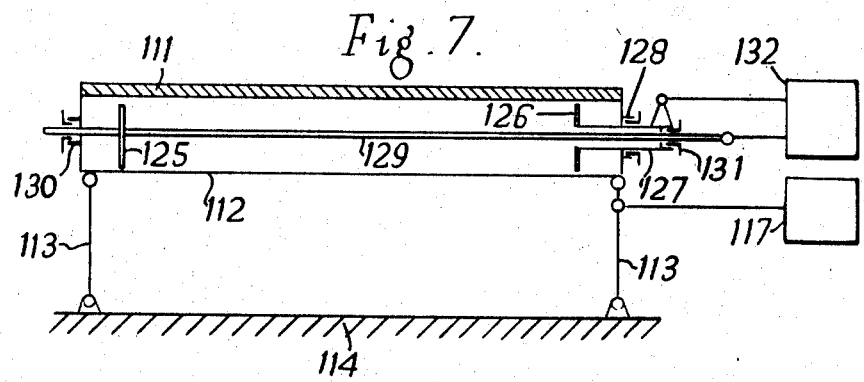
FIGURES 7–12 show in diagrammatic form other embodiments which could be used in place of that shown in FIGURE 3.

FIGURE 7 shows a further embodiment whereby the invention may be put into effect. Here the water in the tank 112 is substantially immobilised by the two baffles 125 and 126 placed near the ends. Baffle 126 may be supported, for example, by a tube 127 passing through a seal 128 in the wall of tank 112. Likewise, baffle 125 may be supported by a rod 129 passing through seals 130, 131. The baffles 125, 126 do not partake in the reciprocating motion applied to the deck 111 by the drive 117. They may however be given a periodic motion towards and away from one another by means of a subsidiary drive 132 synchronised and phased with the drive 117. This periodic motion applies pulses through the liquid in tank 112 to the lower surface of the porous deck 111 and in these circumstances the diaphragms 118 of FIGURE 3 are not required. Alternatively, however, the baffles 125, 126 may be made fast to the fixed base 114 and the pulses applied to the liquid in the tank 112 through diaphragms in the bottom of the tank as illustrated in FIGURE 3 which the arrangement then closely resembles.

Figure 8:
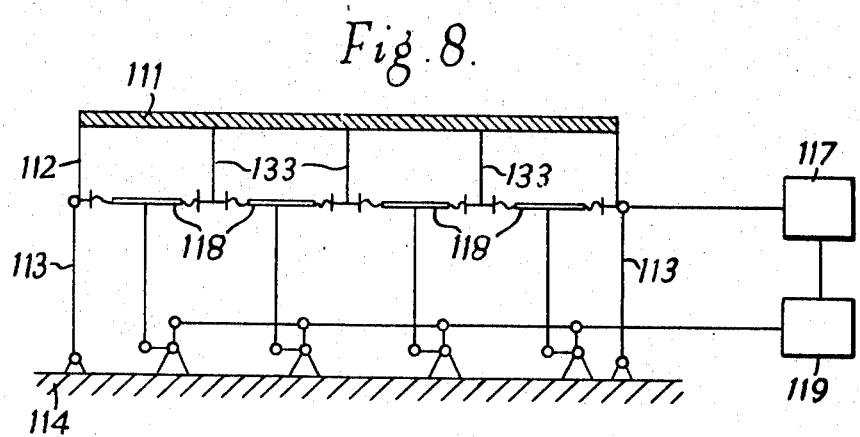

FIGURE 8 shows a further embodiment of the invention. Here the tank 112 is divided into wholly separate compartments by transverse walls 133, each compartment being filled with liquid. Each compartment is provided with a pulsing diaphragm 118 driven through link work from a drive motion 119. For simplicity of illustration the tank is shown divided into only four compartments, but performance is improved as the number of compartments is increased, and the limit is set by the cost of providing sufficiently reliable gear to drive the pulse diaphragms 118.

Figure 9:
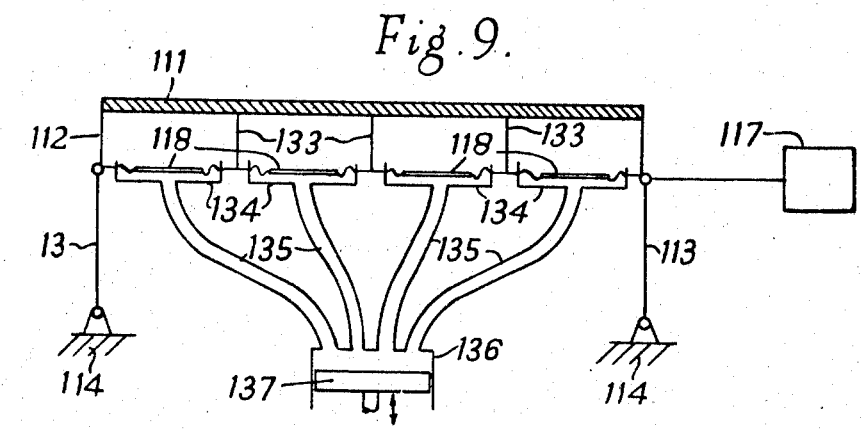

FIGURE 9 shows diagrammatically how the pulse diaphragms 118 of such a construction may be actuated hydraulically. Each diaphragm is enclosed upon the outside of the tank 112 by a chest 134 and from each chest there extends a flexible pipe 135. The flexible pipes, preferably all of the same length, lead to a common cylinder 136 in which slides a piston 137. Reciprocation of the piston 137 causes corresponding motion of diaphragms 118, the motion being transmitted by fluid with which the cylinder 136, pipes 135 and chests 134 are filled. The motion of the piston 137 is synchronised and phased with the main drive 117.

Figure 10:
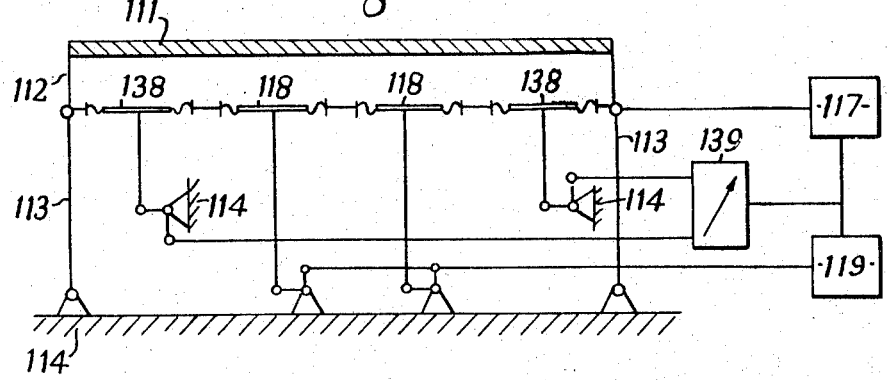

FIGURE 10 shows a still further embodiment of the invention. Here the tank 112 is not compartmented and is provided with pulse diaphragms 118 as in the embodiment of FIGURE 3. Additionally, near the ends of the tank are provided diaphragms 138 having a separate drive mechanism 139. The diaphragms 138 are moved in such manner in relation to the motion of tank 112 that the formation of standing waves within the tank is inhibited. For example, suppose that the left-hand wall of the tank is moving towards the right, then the left-hand diaphragm 138 is moving downwards and the right-hand diaphragm 138 is moving upwards. The area and stroke of diaphragms 138 should be so proportioned that the volume swept by an end wall of the tank during the stroke of the table is equal to the volume swept by the diaphragm in its stroke. The arrow on the driving mechanism 139 for the diaphragms 138 indicates that the mechanism is adjustable so that the stroke and relative phase of the diaphragms may be adjusted for best results.

Figure 11:
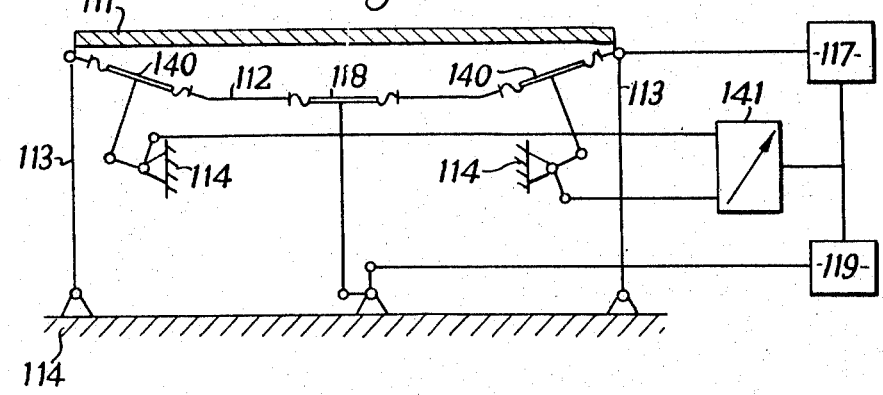

FIGURE 11 shows another embodiment of the invention which is an intermediate form between that of FIGURE 3 and that of FIGURE 10. The tank 112 is made with sloping ends in which are set diaphragms 140 having a driving mechanism 141 synchronised and phased with the main drive 117. The arrow on the mechanism 141 indicates that the stroke of diaphragms 140 can be varied to produce the best effect. Having sloping ends to the tank allows diaphragm 140 to be made relatively large compared with the pistons 115 in FIGURE 3. The diaphragms can therefore have a small stroke allowing stiffer and stronger diaphragm material to be used. They have a more direct effect in immobilising the water in the tank than diaphragms 138 in FIGURE 10, since their motion has a horizontal component.

Figure 12:
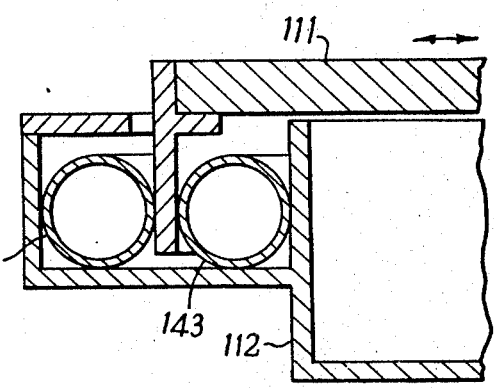

A further possible embodiment of the invention involves having the porous deck separate from the tank but in contact with the open top and sliding over it, the tank being maintained stationary. This avoids the problem of reciprocating the mass of water, but introduces the difficulty of making an effective seal all around the deck and the tank in the presence of much granular material which may well be abrasive. The need for a sliding seal could be avoided by using flexible diaphragms along the sides normal to the direction of motion and a labyrinth seal along the sides parallel to the direction of motion. Another possible means of sealing would be to use inflatable rubber tubes 142 and 143 between deck and tank as shown in FIGURE 12.

Certain known types of head motion for shaking tables give to the table a time/displacement graph which has an asymmetric wave shape. This is done deliberately in order to assist the separation of the components of the ore. When the pulsed deck is employed, transport and separation of concentrate from tailings is so much improved that the asymmetric motion may be replaced by symmetric or simple harmonic motion. Thus the complicated and expensive head motion of the conventional shaking table may be replaced by a cheap and simple crank, Scotch yoke or cam mechanism. If variable stroke were required, it could be attained, for example, by an adaptation of Stephenson's link motion, employing two eccentric cranks at 180° and a slotted link. The use of symmetric instead of asymmetric motion reduces the peak acceleration and hence the peak inertia forces. This allows lighter and hence cheaper construction to be employed. A further advantage is that the phasing of the pulses with the table motion need not be so accurate since the rate of acceleration is more gradual than it is with asymmetric motions.

The invention accordingly represents an important advance in the technique of mineral separation by a combination of reciprocatory motion and pressure pulses synchronised therewith.

We claim:

1. Apparatus for stratifying granular material comprising a table including an elongated tank, a porous deck spaced a short distance from the bottom of the tank, the porosity of said porous deck being constituted by holes sufficiently small to permit upward and downward passage of fluid through the deck while preventing the downward passage through the holes of the material being separated, reciprocating motion producing means for reciprocating the deck in the direction of its length and in its own plane in a recurrent cycle and fluid flow producing means for producing an upward and downward flow of fluid through the porous deck in a cycle of the same length as the reciprocating cycle of the table such that the point at which the fluid flow passing through the deck changes from downward to upward flow is between 30° and 5° of the said reciprocating cycle before the instant at which the deck comes to rest between a forward stroke and the succeeding backward stroke and the point at which the fluid flow passing through the deck changes from upward to downward flow is between 30° of the said cycle before and 70° of the said cycle after the instant at which the deck comes to rest between a backward stroke and the succeeding forward sroke.

2. Apparatus as claimed in claim 1 including means for varying the phase relationship between the table reciprocating cycle and the fluid pulsing cycle.

3. Apparatus as claimed in claim 2 in which a common drive is provided for said reciprocatory motion producing means and said fluid flow producing means and in which phase varying means is located between said common drive and said fluid flow producing means.

4. Apparatus as claimed in claim 3 in which the phase varying means comprises a chain and sprocket drive employing two pairs of adjustable jockey pulleys, each pair being pivoted about the point where the chain passes between them, one pair being spring-urged to maintain the chain taut while the other pair is movable by a manual control, the effect of the operation of which is to alter the respective lengths of chain between opposite sides of the driving and driven sprockets.

5. Apparatus as claimed in claim 1 including a common drive means for producing both reciprocation and pulsing together with means for phase variation located between the drive and the pulse producing means.

6. Apparatus as claimed in claim 5 in which the phase-varying means comprises a chain and sprocket drive employing two pairs of adjustable jockey pulleys, each pair being pivoted about the point where the chain passes between them, one pair being spring-urged to maintain the chain taut while the other pair is movable by a manual control, the effect of the operation of which is to alter the respective lengths of chain between opposite sides of the driving and driven sprockets.

7. Apparatus as claimed in claim 1 in which said fluid flow producing means gives a substantially sinusoidal flow on which is superimposed a steady flow in one direction to produce a net flow in that direction.

8. Apparatus for the separation of granular material comprising a table including an elongated tank, a porous deck spaced a short distance from the bottom of the tank, reciprocating motion producing means for reciprocating the deck in the direction of its length and in its own plane in a recurrent cycle, liquid pulse producing means for producing an upward and downward flow of fluid through the porous deck by way of a body of fluid enclosed between the porous deck and the bottom of the tank and means for preventing substantially all of the body of fluids in the tank including that body of fluid immediately below and adjacent to the deck from sharing to any marked extent in the reciprocating movement of the deck.

9. Apparatus as claimed in claim 8 in which the tank is provided with end walls which are maintained stationary.

10. Apparatus as claimed in claim 9 in which a member which serves to maintain the end walls of the tank stationary is extended into the tank and carries baffles which assist in preventing said reciprocating movement of the fluid in the tank.

11. Apparatus as claimed in claim 8 in which baffles are provided adjacent the ends of the tank, said baffles being arranged to be reciprocated in opposite directions simultaneously so as to produce pressure pulses without significant translational movement of the enclosed body of fluid.

12. Apparatus as claimed in claim 8 in which the tank is subdivided into a plurality of sections each including individual means in the form of diaphragms for producing pulses.

13. Apparatus as claimed in claim 12 in which the diaphragms are mechanically operated from the same driving means as produce the reciprocating movement of the porous deck.

14. Apparatus as claimed in claim 12 in which the diaphragms are operated by fluid pressure from a cylinder having a piston which is reciprocated at the frequency of reciprocation of the porous deck.

15. Apparatus as claimed in claim 8 in which said liquid pulse producing means comprises first mechanically-operated diaphragms towards the middle of the bottom of the tank and in which further mechanically-operated diaphragms are provided towards the ends of the bottom of the tank, said further diaphragms arranged to operate at the same frequency but with a definite phase displacement compared with the movement of the first pulse-producing diaphragms.

16. Apparatus as claimed in claim 15 in which the further diaphragms are inclined to the bottom of the tank and are located between the ends of the porous deck and the bottom of the tank adjacent to the pulse-producing diaphragms.

17. Apparatus as claimed in claim 8 in which said tank is secured in fixed position, in which said porous deck is mounted to be capable of reciprocatory movement relative to said fixed tank and in which fluid-tight connection means are provided between said movable deck and said stationary tank.

18. Apparatus for the separation of granular material comprising a table including an elongated tank, a porous deck spaced a short distance from the bottom of the tank, reciprocatory motion producing means for reciprocating the deck and the tank in the direction of their length and in their own plane in a recurrent cycle, liquid pulse producing means for producing an upward and downward flow of fluid through the porous deck by way of a body of fluid enclosed between the porous deck and the bottom of the tank and means for preventing this body of fluid from sharing to any marked extent in the reciprocating movement of the tank.

References Cited

UNITED STATES PATENTS

| | | | |
|---|---|---|---|
| 1,461,647 | 7/1923 | Bookwalter | 209—425 |
| 1,832,048 | 11/1931 | Peale | 209—467 |
| 1,961,449 | 6/1934 | Peale et al. | 209—467 |
| 2,426,337 | 8/1947 | Bird | 209—426 |
| 2,497,339 | 2/1950 | Bastanchury | 209—469 |
| 2,698,686 | 1/1955 | Bolhar | 209—504 |
| 2,853,192 | 9/1958 | Berry | 209—469 |
| 3,236,380 | 2/1966 | Brastad et al. | 209—469 |

FOREIGN PATENTS 583,506  9/1959  Canada.

HARRY B. THORNTON, *Primary Examiner.*

TIM R. MILES, *Assistant Examiner.*